United States Patent [19]
Borland

[11] Patent Number: 4,945,466
[45] Date of Patent: Jul. 31, 1990

[54] RESONANT SWITCHING CONVERTER

[76] Inventor: Walter G. Borland, 8319 Dunstaff Rd., Charlotte, N.C. 28213

[21] Appl. No.: 314,467

[22] Filed: Feb. 22, 1989

[51] Int. Cl.[5] .......................................... H02M 3/338
[52] U.S. Cl. ..................................... 363/97; 363/19; 363/131; 331/117 R
[58] Field of Search ...................... 363/16, 18, 19, 27, 363/28, 29, 79, 96, 97, 131, 135; 331/117 R

[56] References Cited

U.S. PATENT DOCUMENTS

| | | | |
|---|---|---|---|
| 3,387,201 | 6/1968 | Greenberg et al. | 363/28 |
| 3,618,130 | 11/1971 | Garuts | 331/109 |
| 3,828,239 | 8/1974 | Nagai et al. | 321/2 |
| 3,921,005 | 11/1975 | Watrous | 307/64 |
| 4,055,791 | 10/1977 | Bland et al. | 363/28 |
| 4,138,715 | 2/1979 | Miller | 363/28 |
| 4,184,197 | 1/1980 | Cuk et al. | 363/16 |
| 4,257,087 | 3/1981 | Cuk | 363/16 |
| 4,262,328 | 4/1981 | Bloom et al. | 363/16 |
| 4,355,352 | 10/1982 | Bloom et al. | 363/16 |
| 4,413,313 | 11/1983 | Robinson | 363/80 |
| 4,415,959 | 11/1983 | Vinciarelli | 363/21 |
| 4,441,146 | 4/1984 | Vinciarelli | 363/20 |
| 4,471,327 | 9/1984 | Moss | 331/111 |
| 4,486,823 | 12/1984 | Palm | 363/21 |
| 4,510,562 | 4/1985 | Maeba | 363/19 |
| 4,523,269 | 6/1985 | Baker et al. | 363/130 |
| 4,675,797 | 6/1987 | Vinciarelli | 363/21 |
| 4,679,129 | 7/1987 | Sakakibara et al. | 363/17 |
| 4,737,898 | 4/1988 | Banfalvi | 363/19 |

FOREIGN PATENT DOCUMENTS

| | | | |
|---|---|---|---|
| 12287 | 3/1965 | Japan | 331/117 R |
| 58170358 | 10/1988 | Japan | |
| 155382 | of 1962 | U.S.S.R. | 331/117 R |
| 920667 | 4/1982 | U.S.S.R. | 363/27 |
| 2025713 | 1/1980 | United Kingdom | 363/96 |

OTHER PUBLICATIONS

Todd, Philip C., Practical Resonant Power Converters—Theory and Application, Pt. I, Apr., 1986, pp. 30-34, (PowerTechnics).
Todd, Philip C., Practical Resonant Power Converters—Theory and Application, Pt. II, May, 1986, pp. 29-35, (PowerTechnics).
Todd, Philip C., Practical Resonant Power Converters—Theory and Application, Pt. III, Jun. 1986, pp. 32-37, (PowerTechnics).
Goodenough, Frank, Resonant-Mode Controller Runs Switching Supplies at 1.5 MHz, Jun. 9, 1988, pp. 43-48, (Electronic Design).
Onodera et al., High-Efficiency Switching Regulator Using Sub Class E Switching Mode, pp. 132-137.
King et al., Inherent Overload Protection for the Series Resonant Converter, Nov., 1983, pp. 820-830, (IEEE Trans. A & E.S.).
R. W. Carlsten, Zero-Cross Switching Protects Transistors, Jan. 12, 1984, pp. 271-275, (EDN publication).
Liu et al. Resonant Switches—A Unified Approach to Improve Performances of Switching Converters, 1984, pp. 344-351, (Intelel '84).
Liu et al., Resonant Switches—Topologies and Characteristics, 1985, pp. 1-11, (IEEE Power Elec. Spec. Conf. '85).

Primary Examiner—William H. Beha, Jr.
Attorney, Agent, or Firm—Morgan & Finnegan

[57] ABSTRACT

A resonant switching converter including a first series resonant circuit including a first inductor and a first capacitor connected in series with a voltage source, a second series resonant circuit including a second inductor and the first capacitor, a switch connected in series with said second inductor and responsive to the current in the first inductor for enabling a discharge path through the load for the charge stored by the first capacitor. A first control circuit responsive to the voltage on the first capacitor may also be provided for operating the switch at a controlled voltage to facilitate line and load regulation. A second control circuit responsive to the output voltage may be included to provide line and load regulation. The switch is only closed after the resonant capacitor has charged to its peak value or beyond. Accordingly, the energy stored in the first capacitor may be accurately controlled between the limits of 0-2 times the input voltage and large changes in line and load may be tolerated without large changes in operating frequency.

7 Claims, 6 Drawing Sheets

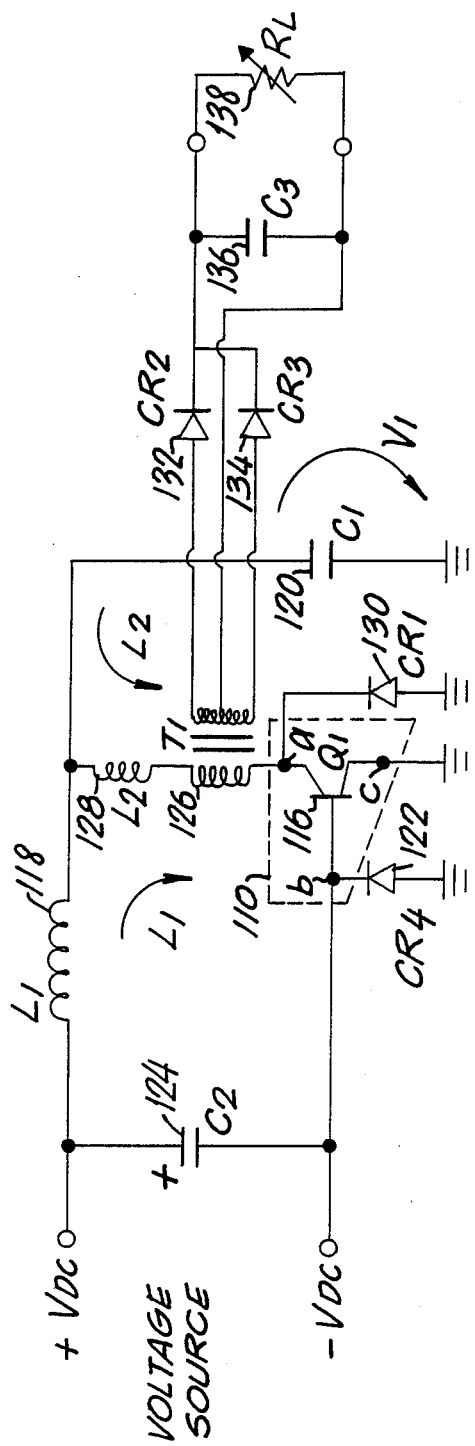
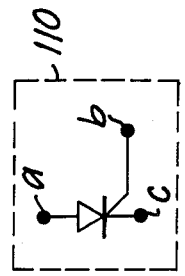
FIG. 3B
FIG. 3
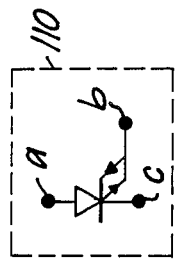
FIG. 3A

RESONANT SWITCHING CONVERTER

BACKGROUND OF THE INVENTION

Resonant converters have been used in power conversion equipment for some time and in various forms. Most of the early work was done using SCR's (Silicon Controlled Rectifiers) as the switching element. SCR's were suited to this type of operation largely due to their power handling capability. The main disadvantage of using SCR's as the switching element was the switching speed. The frequency of operation was limited to less than 10 KHz. Since this low frequency was within the audible range, such equipment was usually very noisy. More recently, there has been interest in operating at much higher frequencies extending into the mega-hertz region. This is possible due to the availability of much faster components such as fast switching transistors, MOS-FETs, GTO's and faster SCR's.

U.S. Pat. No. 4,138,715 to Miller describes a resonant converter with a control device that senses when the energy in a second inductor is zero (i.e., current in the second inductor is zero). In any resonant converter this is important because if the switching device is turned off while there is still current flowing through the inductor, then a switching transient will occur which can destroy the switching device or, if snubbed or otherwise limited, will increase switching losses defeating one of the advantages of resonant switching.

Miller describes an arrangement which compares the resonant capacitor voltage to the DC input voltage. An additional comparator is provided which compares the output voltage to a reference voltage for the purpose of regulating the output voltage. Together, these two voltage comparators serve to turn the switching device on only when the resonant capacitor voltage is at or above the DC input voltage and the output voltage is below the reference voltage. In this manner, the switching device can only be turned on when the capacitor voltage is within the shaded region shown in FIG. 1.

Accordingly, Miller turns the resonant circuit "on" and "off" at some relatively fixed voltage level on the resonant capacitor with this voltage level being dependent on the DC input voltage. The frequency of operation may therefore vary over a wide range to compensate for line and load variations.

In most resonant switching converters, the output voltage or current delivered to the load is controlled by varying the repetition rate at which switch S1 is open and closed. In this case the power capable of being delivered to the load is then approximated as a linear function of the repetition frequency as expressed by $$P_O = \tfrac{1}{2} C_1 V_{C1}^2 f$$

wherein:
$P_O$ = Output power
$C_1$ = Resonant capacitor value
$V_{C2}$ = Resonant capacitor voltage at time of switching
$f$ = Repetition frequency In most resonant switching converters, the capacitor voltage at the time of switching is relatively constant. If the input voltage were changed, causing a corresponding change in $V_{C1}$ at the time of switching, then the power capable of being delivered to the load would vary as a function of $V_{C1}^2$ assuming the frequency $f$ is held constant. Thus, a minor shift in the input voltage produces a large shift in the power capable of being delivered to the load. However, varying the input voltage is difficult since this is usually a rectified and filtered DC voltage derived from 50 Hz or 60 Hz mains and would require an intermediate conversion stage.

There are many disadvantages of existing resonant converter topologies such as:
(1) complex control schemes are required to insure proper switching of the resonant currents;
(2) wide frequency variations are required to compensate for line and load variations;
(3) usually cannot operate to no load;
(4) cannot operate over extremely wide input or output ranges without wide variations in the operating frequency; and
(5) changes in the values of resonant circuit components can adversely affect operation.

SUMMARY OF THE INVENTION

With the foregoing in mind, it is an object of the invention to provide a resonant switching converter which eliminates the above limitations while minimizing cost and improving reliability.

The foregoing and other objects of the invention are attained by employing a first series resonant circuit including a first inductor and a first capacitor connected in series with a voltage source, a second series resonant circuit including a second inductor and the first capacitor, a switch connected in series with said second inductor and responsive to the current in the first inductor for enabling a discharge path through the load for the charge stored by the first capacitor. A first control means responsive to the voltage on the first capacitor may also be provided for operating the switch at a controlled voltage to facilitate line regulation. A second control means responsive to the output voltage may be included to provide line and load regulation.

Operating in accordance with the instant invention, the switch is only closed after the resonant capacitor has charged to its peak value or thereafter. Accordingly, the energy stored in the first capacitor may be accurately controlled at the time of switching between the limits of 0–2 times the input voltage and large changes in line and load may be tolerated without large changes in operating frequency.

BRIEF DESCRIPTION OF THE DRAWINGS

The accompanying drawings, referred to herein and constituting a part hereof, illustrate preferred embodiments of the invention and, together with the description, serve to explain the principles of the invention, wherein:

FIG. 3A shows a gate turn off silicon controlled rectifier which may replace the transistor of FIG. 3;

FIG. 3B shows a silicon controlled rectifier which may replace the transistor of FIG. 3;

DETAILED DESCRIPTION OF THE DRAWINGS

Figure 1:
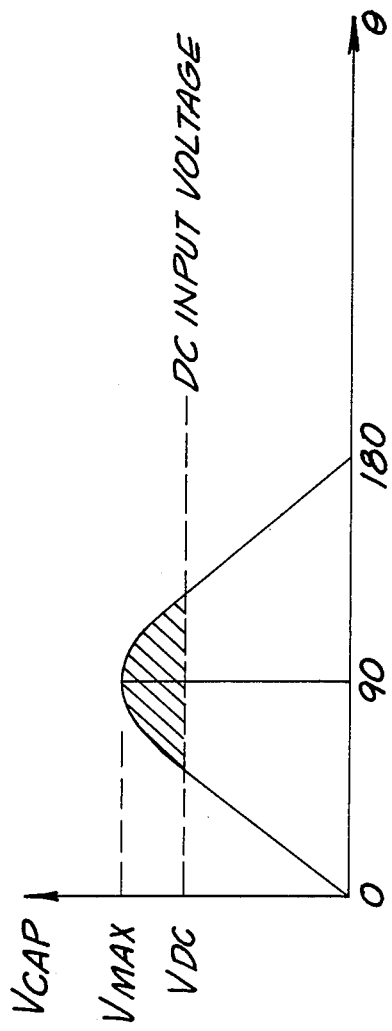
FIG. 1 is a capacitor voltage diagram.
Figure 2:
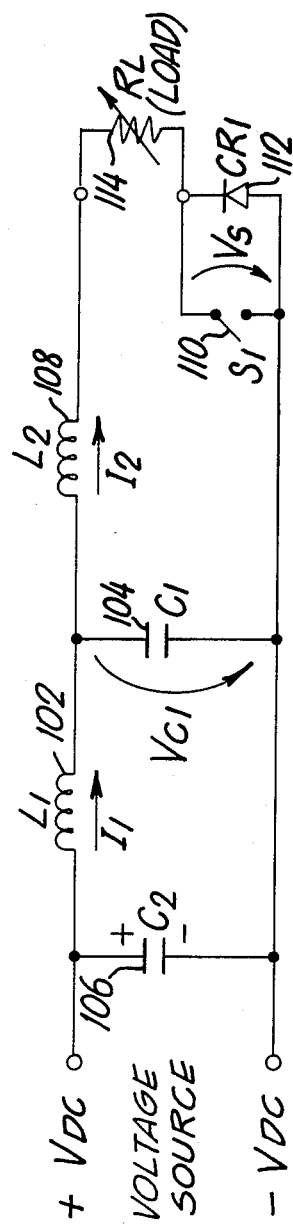
FIG. 2 is a simplified circuit diagram according to the invention.

The simplified circuit diagram of FIG. 2 depicts a resonant switching converter with two resonant loops. The resonant frequency of the second resonant loop is generally higher than the resonant frequency of the first resonant loop, typically three times higher. The first or input resonant loop is comprised of a first inductor 102, a first capacitor 104, and a second capacitor 106. The second or output resonant loop is comprised of first capacitor 104, a second inductor 108, switch 110, diode 112 and the output load 114. It should be appreciated that if the value of second capacitor 106 is much larger than the value of first capacitor 104, then second capacitor 106 will have a minimal effect on the resonant frequency of the input resonant loop.

Figure 3:
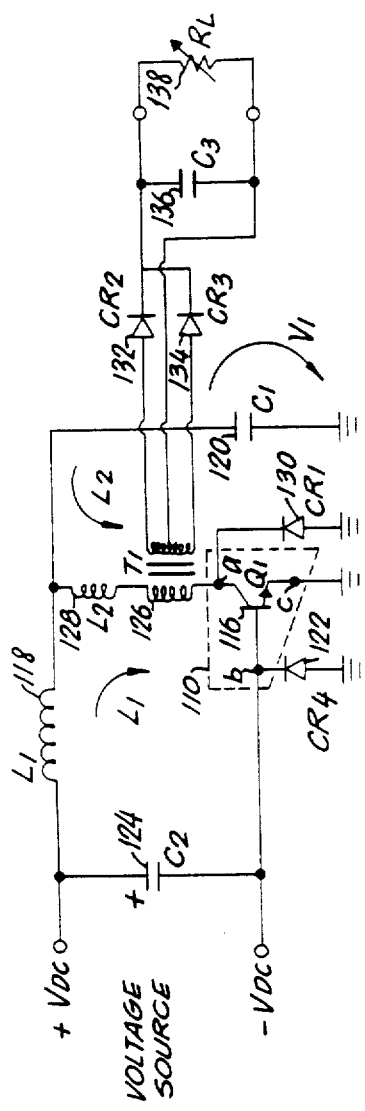
FIG. 3 is a power oscillator circuit diagram according to the invention.
Figure 4:
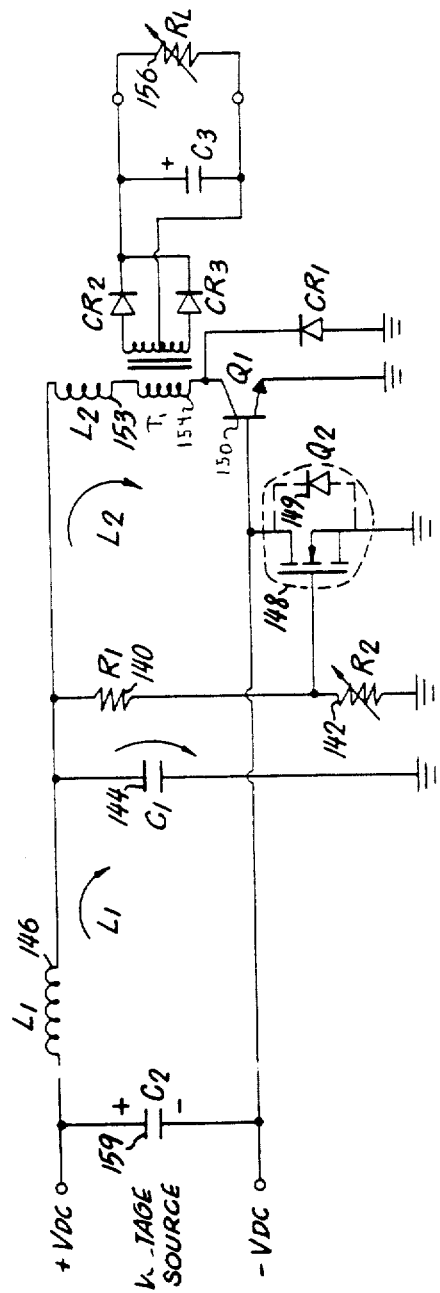

It will be appreciate by those skilled in the art that switch 110 may be any semiconductor device such as a bipolar transistor, a silicon controlled rectifier (SCR), a gate turn off silicon controlled rectifier (GTO), or other suitable switching device. In FIG. 3, switch 110 is shown to be a bipolar transistor. In FIGS. 3A and 3B, switch 110 is shown to be a gate turn off silicon controlled rectifier and a silicon controlled rectifier, respectively. Each of these switches is interchangeable in the circuit at points a, b, c.

If a voltage source is applied at time t=0 and switch 110 is open, then first capacitor 104 will begin charging to twice the source voltage at which time, if switch 110 is closed, the energy stored in first capacitor 104 would be delivered through the output resonant loop to the load. This represents the maximum power that may be transferred to the load. If switch 110 is not closed at this time, then first capacitor 104 will start to discharge back through first inductor 102 into second capacitor 106. Due to the resonant action of the circuit, the first capacitor 104 voltage will ring back to zero (assuming a high Q circuit). If switch 110 is then closed when the capacitor 104 voltage is zero or close to zero, little energy is transferred through the output resonant loop to the load.

In accordance with the instant invention, switch 110 is only closed at or after the voltage has reached its peak value on the first capacitor 104 voltage waveform. Accordingly, the energy stored in the resonant first capacitor 104 may be accurately controlled by controlling the voltage of capacitor 104 at the time of switching between the limits of 0-2 times the input voltage. The maximum shift in the repetition frequency will be a function of the resonant frequency differences between the input and output resonant circuits. Additionally, the output may be controlled from near zero to maximum and wide changes in line and load may be tolerated without large changes in the operating frequency. This allows operation to no load which is not possible in most conventional resonant converters.

The circuit shown in FIG. 3 depicts the basic power oscillator of the bimodal resonant converter. The operation of this circuit is as follows: Assuming that transistor 116 is "off" and that current is flowing from the positive terminal of the voltage source, through inductor 118, capacitor 120, diode 122, and back to the negative terminal of the voltage source, current will continue to flow in this direction until capacitor 120 is charged to approximately twice the source voltage. When the voltage on capacitor 120 reaches this peak value, the current reverses and capacitor 120 begins to discharge through inductor 118, capacitor 124, base-emitter of transistor 116 back to capacitor 120. This action forward biases transistor 116, turning transistor 116 "on", and causing capacitor 120 to discharge through inductor 128, transformer 126 (load), transistor 116 collector-emitter and back to capacitor 120. It should be noted that when transistor 116 is "on", the discharge paths through inductor 118 and inductor 128 are essentially in parallel (from an AC equivalent circuit standpoint) and thus the base drive to transistor 116 is proportional to the ratio of these two inductances and can be selected to provide the proper drive current to transistor 116. It will be appreciated by those skilled in the art that the second inductor 128 need not be, and typically is not, a discrete device. The equivalent of this inductor may be obtained by establishing an appropriate effective leakage inductance between the primary and secondary windings of transformer 126.

When the current through inductor 118 reverses again, due to the resonant action of inductor 118, capacitor 120, then current again flows to the right through inductor 118, capacitor 120, diode 122 and back to the negative terminal of the voltage source. This action tends to reverse bias the base-emitter of transistor 116 turning this transistor "off". At the same time current has reversed in the output resonant loop of inductor 128, capacitor 120 and flows from the bottom (or ground) side of capacitor 120, through diode 130, transformer 126 (load), inductor 128 and back to the top of capacitor 120. Since the currents through inductor 118 and inductor 128 are 180° out of phase, transistor 116 turns "off" while diode 130 is conducting and the current through transistor 116 is zero. There are, therefore, no switching losses associated with transistor 116, lowering component stress and improving reliability.

It may be appreciated by those skilled in the art that proper switching is achieved without the use of complex control schemes. It may also be appreciated that changes in the values of the resonant components will not cause improper switching as could be the case with independent control and drive schemes.

Diode 132, diode 134, and capacitor 136 form a full wave centertap rectifier and filter combination and in conjunction with transformer 126 act to provide an isolated DC output voltage to the load 138. Since no control of this output voltage is provided, this voltage will vary as the load 138 and/or the source voltage varies. Because the currents through the input resonant loop (inductor 118, capacitor 120) and the output resonant loop (inductor 128, capacitor 120) are sinusoidal, the circuit naturally generates less EMI than a similar square wave inverter having waveforms rich in harmonics.

Figure 4:
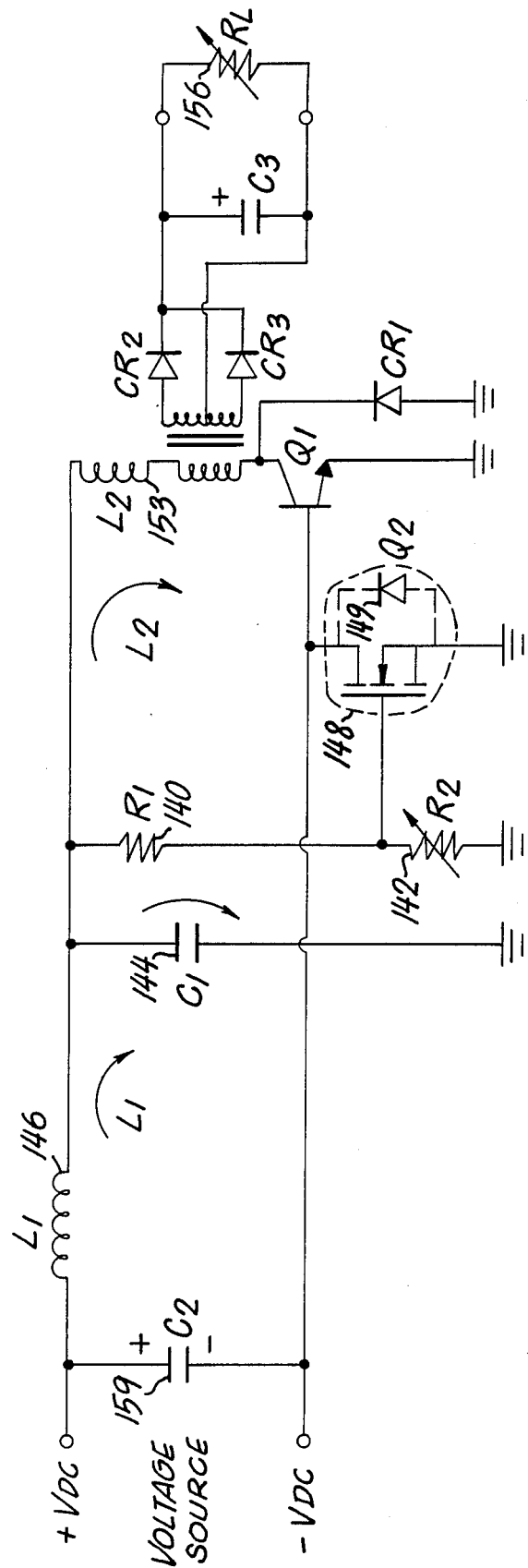
FIG. 4 is a circuit diagram according to the invention including a first control means to compensate for variations in the line or source voltage.

FIG. 4 shows a circuit with a control means to compensate the output voltage for changes in the source voltage. Resistor 140 and resistor 142 form a voltage divider providing a voltage proportional to the voltage on capacitor 144. In this circuit, as the capacitor 144 voltage increases, current flows through inductor 146, capacitor 144, body diode 149 of transistor 148, and back to the source and transistor 150 is "off". When the voltage on capacitor 144 reaches the point where the gate voltage of transistor 148 is at its threshold, then transistor 148 turns "on" shunting the base-emitter of transistor 150 insuring transistor 150 is kept "off". When the voltage on capacitor 144 reaches its peak, the current through inductor 146 reverses and capacitor 144 then begins to discharge through inductor 146, capacitor 159, and MOS-FET transistor 148 and back to capacitor 144.

When the voltage on capacitor 144 discharges to the point that the gate voltage of transistor 148 again reaches its threshold value, then transistor 148 turns "off" allowing the current that was flowing through transistor 148 to transfer to the base of transistor 150, turning transistor 150 "on", and discharging capacitor 144 through inductor 153, transformer 154 (load), and transistor 150. When the current through inductor 146 again reverses due to the resonant action of inductor 146 and capacitor 144, then transistor 150 turns "off" as previously described and the cycle is repeated.

It will be appreciated that transistor 150 turns "on" when the capacitor 144 voltage is at a value determined by the voltage divider resistor 140, resistor 142, and the gate threshold voltage of transistor 148. It should also be appreciated to those skilled in the art that many other means of controlling the point at which transistor 148 is turned "on" and "off" are possible. This circuit may compensate for changes in the source voltage and keep the output voltage relatively constant for a fixed load 156, but the output voltage may vary widely as the load is varied.

Figure 5:
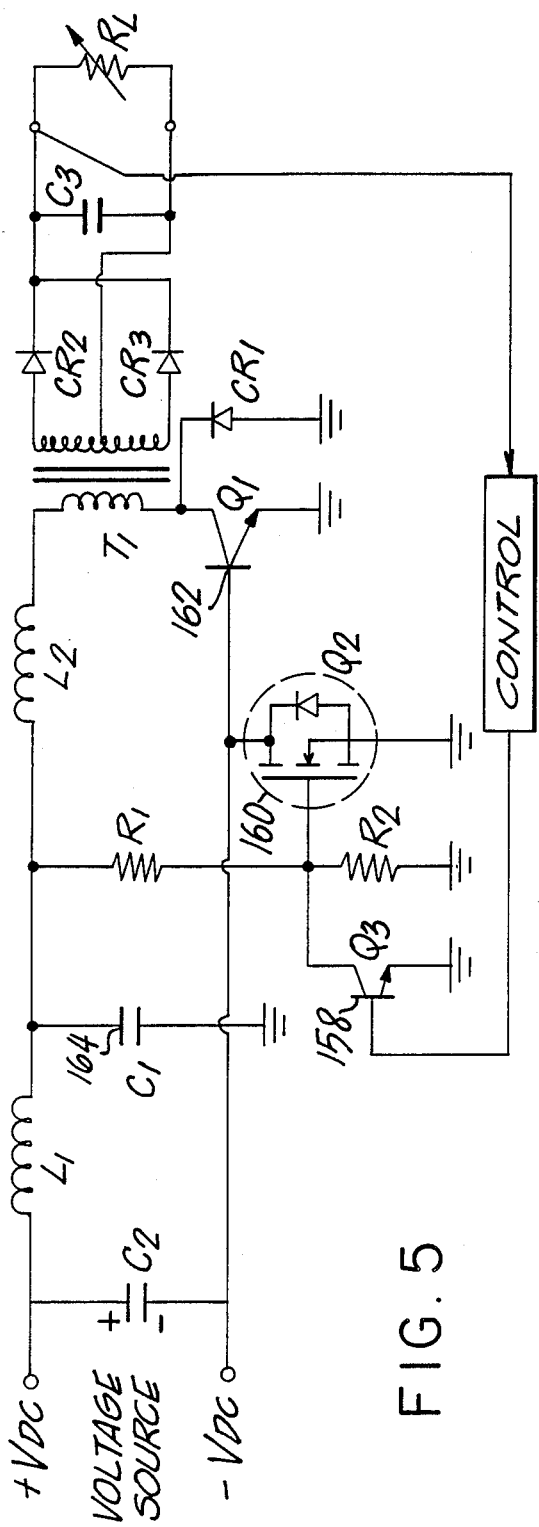
FIG. 5 is a circuit diagram according to the invention showing first and second control means for compensating for variations in the line or source voltage and load.

Both line and load regulation may be accomplished by providing a means to vary the value of resistor 142 as a function of the output voltage. FIG. 5 shows a means for accomplishing this. In this circuit, transistor 158 is added in place of resistor 142 of FIG. 4 to form a variable resistance and thus control the gate voltage of transistor 160 in response to changes in the output voltage. In this way the output can be tightly controlled for both changes in the input or source voltage and changes in the load resistance. Because the point at which transistor 162 turns "on" can be controlled from the peak voltage on capacitor 164 to essentially zero volts on capacitor 164, and since the energy transferred to the load is a function of the square of the voltage on capacitor 164, the circuit will tolerate wide swings in source voltage and/or load resistance with minimal shifts in the operating frequency.

Oscillations of the circuit shown in FIG. 3 can be initiated by sufficient perturbation of the input voltage to start the resonant circuit comprised of inductor 118, capacitor 120, ringing or by momentarily pulsing the switching transistor 116 "on".

Figure 6:
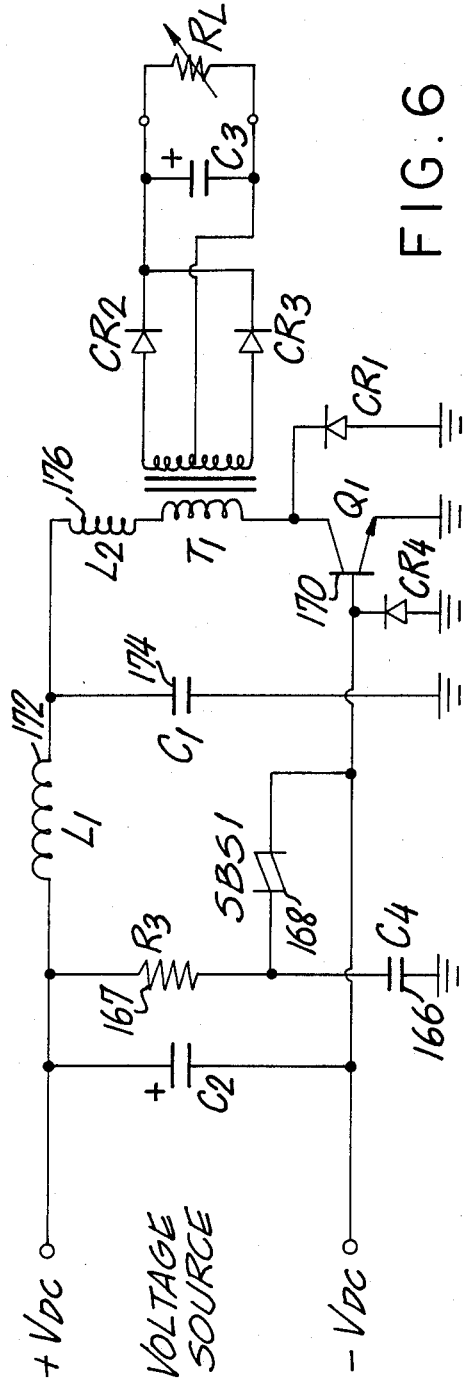
FIG. 6 shows a circuit according to the invention including means to start oscillation of the circuit.

In the circuit shown in FIG. 6, the capacitor 166 is charged through resistor 167 until the threshold voltage of the silicon bilateral switch 168 is reached at which time silicon bilateral switch 168 turns "on" discharging capacitor 166 into the base of transistor 170 initiating oscillations in the resonant circuit comprised of inductor 172, capacitor 174, and inductor 176, capacitor 174. Many other starting techniques are possible and will be appreciated by those skilled in the art.

Figure 7:
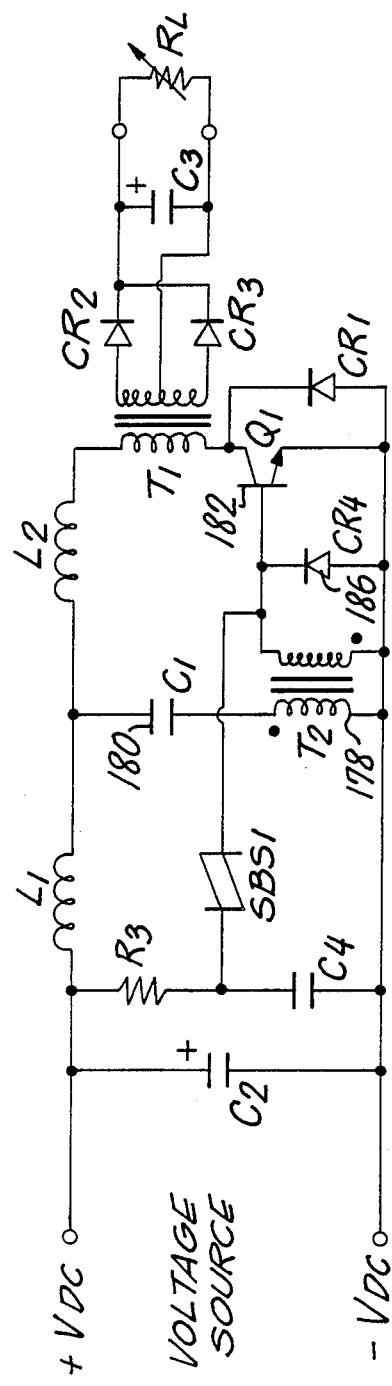
FIG. 7 shows a circuit according to the invention providing an alternative method of driving the switching transistor using a proportional drive transformer.

Since the resonant capacitor 174 conducts a current proportional to the sum of the current through the input inductor 172 and the output inductance 176, an alternate method of driving transistor 170 can be used. In FIG. 7, a drive transformer 178 is added in series with capacitor 180 and the secondary is coupled to the base of transistor 182 with the winding polarities as depicted.

Figure 8:
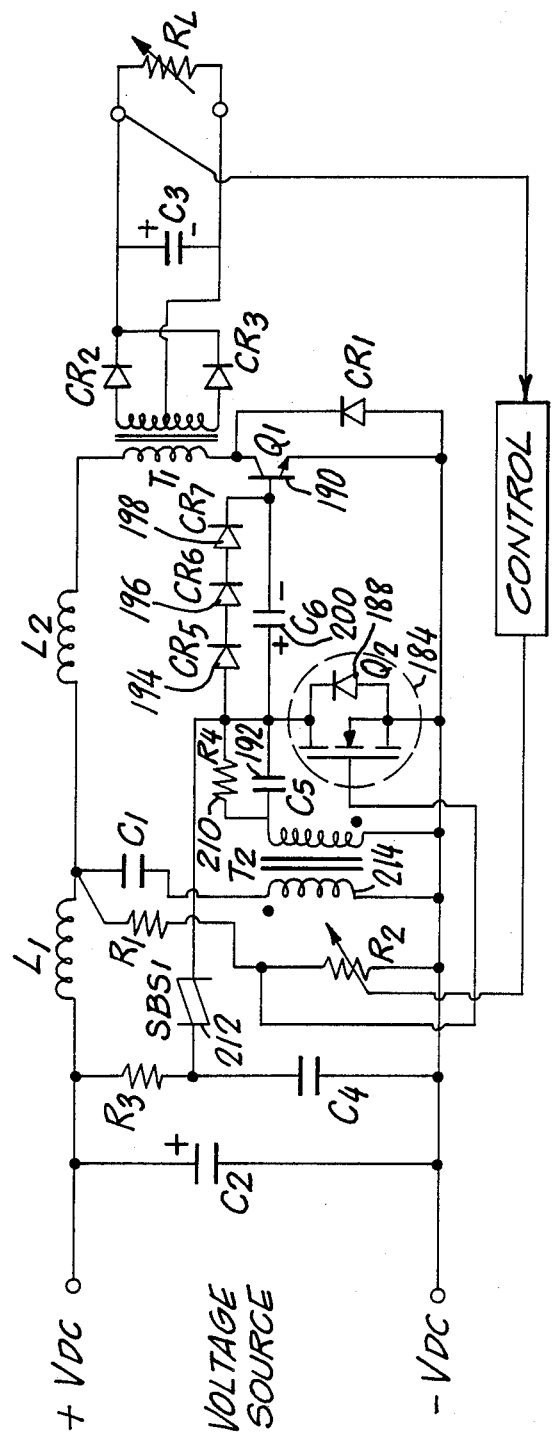
FIG. 8 shows a circuit according to the invention including means for improving the turnoff drive for the switching transistor.

In FIG. 8, the first and second control means are added as described above and the body diode 188 of MOS-FET transistor 184 replaces diode 186 shown in FIG. 7. The circuit of FIG. 8 also includes some components used to provide a more efficient drive for transistor 190 which are not required as part of the basic invention. These components are capacitor 192, diode 194, diode 196, diode 198, capacitor 200, and resistor 210. Resistor 210 is used to provide a path for silicon bilateral switch 212 leakage current. Capacitor 192 is used to prevent DC current from flowing in transformer 214 secondary winding and diode 194, diode 196, diode 198 and capacitor 200 are used to develop a voltage to reverse bias transistor 190 at turn off to facilitate faster switching of transistor 190.

Figure 9:
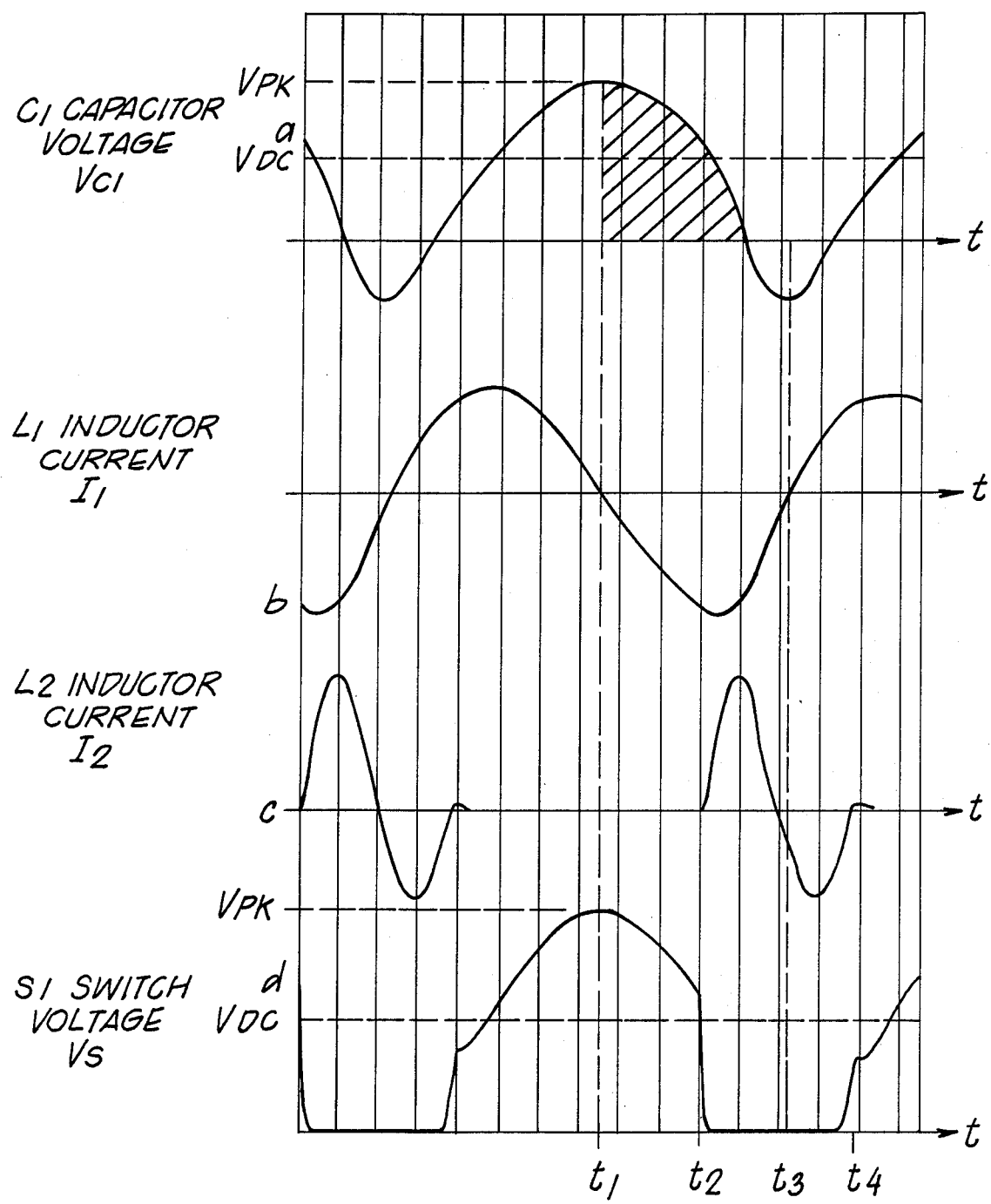
FIG. 9 are waveform diagrams according to the invention.

FIG. 9 shows typical waveforms for the bimodal resonant circuit. The simplified circuit shown in FIG. 2 can be used to explain the waveforms shown in FIG. 9.

FIG. 9a shows the voltage on the resonant capacitor 104. It should be noted that switch 110 can only turn "on" in the shaded portion of the waveform. This is true since switch 110 is responsive to the input inductor current $I_1$ and can only be "on" or closed when current $I_1$ is negative.

With no control present it should then be appreciated that switch 110 would turn "on" at time $t_1$ since this is the point where current $I_1$ first goes negative. With control present switch 110 could turn "on" at any time during which inductor current $I_1$ is negative. FIG. 9 shows this occurring at time $t_2$ when current begins to flow through the output resonant circuit comprised of inductor 108, capacitor 104, switch 110, and the load 114. This current $I_2$ is shown in FIG. 9c. When current $I_1$ goes positive switch 110 turns "off" (opens). It should be noted that this occurs when $I_2$ is negative or diode 112 is conducting and thus switch 110 is not carrying current and would have no switching losses. FIG. 9d shows the voltage V across switch 110. Except for the time that switch 110 is "on" or closed the voltage $V_s$ is essentially equal to the resonant capacitor voltage, $V_{Cl}$. At time $t_4$, current $I_2$ is again zero and diode 112 becomes reverse biased and the cycle would then repeat. It should be noted that $V_{Cl}$, $I_1$ and $I_2$ are essentially sinusoidal thus minimizing electromagnetic interference (EMI) problems since the waveforms are not rich in harmonics as in a pulse width modulated (PWM) square wave inverter.

It will be appreciated by those skilled in the art that the invention provides numerous features and advantages over present resonant switching converters. The resonant converter according to the instant invention provides operation in a bimodal resonant mode where one series resonant circuit (first inductor 102, first capacitor 104) is used to transfer energy between a voltage source and a resonant capacitor (first capacitor 104) and a second series resonant circuit (first capacitor 104, second inductor 108) is used to transfer energy from the resonant capacitor (first capacitor 104) to a load through closure of a switch. The resonant converter according to the invention also provides a control means whereby the energy transfer described above can be accomplished in a controlled manner.

The resonant converter according to the invention also provides a bimodal resonant power oscillator providing inherent forward and reverse drive current for operating a power switching device such as a bipolar transistor, SCR, or GTO and capable of delivering energy to a load.

A first control means is provided which senses the voltage on the resonant first capacitor for the purpose of operating a switching means used to shunt the base-emitter of the power switching device described above and thus controlling where in the resonant cycle the switching device is turned "on" and "off". Such control means is sensitive to variations of the input or source voltage and thus provides inherent line regulation. The switching means may comprise a MOS-FET transistor utilizing the inherent body diode of the device to conduct reverse current.

The resonant converter according to the invention may also provide a method of developing a bias voltage ($V_{bias}$) which is relatively insensitive to changes in the output voltage by utilizing the voltage developed across the input resonant inductor (first inductor 102) or a secondary winding on the inductor. Such secondary winding could also be used to provide an isolated voltage proportional to the voltage on the resonant capacitor for the purpose of implementing the first control means described above.

A second control means may be provided which senses the output voltage and, in conjunction with the first control means, is sensitive to variations in the input or source voltage and the output voltage and acts to control the switching means so as to provide both line and load regulation.

While the invention has been described in its preferred embodiments, it is to be understood that the words which have been used are words of description, rather than limitation, and that changes may be made within the purview of the appended claims without departing from the true scope and spirit of the invention in its broader aspects.

What is claimed:

1. A resonant switching converter for providing an output voltage to a load, comprising:
   (a) a first series resonant circuit including a first inductor and a first capacitor connected in series with a voltage source;
   (b) a second series resonant circuit including a second inductor and said first capacitor;
   (c) switch means connected in series with said second inductor and responsive to the current in said first inductor for enabling a discharge path to the load for a charge stored by said first capacitor; and
   (d) a first control means responsive to the voltage on said first capacitor for operating said switch means at a controlled voltage on said first capacitor.

2. The resonant switching converter of claim 1, wherein said first control means includes a second capacitor on the voltage source side of said first inductor and operatively coupled to said first switching means.

3. The resonant switching converter of claim 1, wherein said first control means comprises:
   (a) a second capacitor on the voltage source side of said first inductor and operatively coupled to said first switching means;
   (b) a voltage divider circuit including a first resistor and a second resistor connected in parallel with said first capacitor; and
   (c) a second transistor operatively coupled to said first transistor and to a point between said first resistor and second resistor.

4. The resonant switching circuit of claim 3, wherein said second transistor is a field effect transistor.

5. A resonant switching converter according to claim 7, further comprising a second control means responsive to the output voltage for operating said switch means to provide a controlled output voltage.

6. The resonant switching circuit of claim 3, further comprising second control means including means for varying the resistance of said second resistor responsive to the output voltage to the load.

7. The resonant switching circuit of claim 6, wherein said second resistor is a transistor controlled by said second control means.

* * * * *

UNITED STATES PATENT AND TRADEMARK OFFICE
CERTIFICATE OF CORRECTION

PATENT NO. : 4,945,466
DATED : July 31, 1990
INVENTOR(S) : Walter G. Borland

It is certified that error appears in the above-identified patent and that said Letters Patent is hereby corrected as shown below:

In the Abstract, line 12, delete "and load";

Column 1, line 58, "$V_{c2}$" should be --$V_{c1}$--;

Column 3, line 28, "appreciate" should be --appreciated--;

Claim 5, line 2, "7" should be --1--; and

Figs. 3 and 4 should be as shown in the attached sheets.

Signed and Sealed this

Fourth Day of February, 1992

Attest:

HARRY F. MANBECK, JR.

Attesting Officer     Commissioner of Patents and Trademarks